United States Patent [19]

Farmer et al.

[11] Patent Number: 4,896,856
[45] Date of Patent: Jan. 30, 1990

[54] ELECTRICAL EQUIPMENT CLUSTER MOUNT

[75] Inventors: Marion R. Farmer, Germantown; Randall L. Hook, Memphis, both of Tenn.

[73] Assignee: Aluma-Form, Inc., Memphis, Tenn.

[21] Appl. No.: 251,125

[22] Filed: Sep. 29, 1988

[51] Int. Cl.[4] .............................................. E04G 3/00
[52] U.S. Cl. .................................. 248/219.4; 211/107
[58] Field of Search ............... 248/219.4, 218.4, 219.3, 248/172; 52/697, 40; 211/107, 26

[56] References Cited

U.S. PATENT DOCUMENTS

| | | | |
|---|---|---|---|
| 2,708,087 | 5/1955 | Blackstone | 248/219.4 X |
| 2,879,964 | 3/1959 | Anderson et al. | 211/107 |
| 2,990,151 | 6/1961 | Phillips | 248/219.3 X |
| 3,374,978 | 3/1968 | Salmon et al. | 211/107 |
| 3,653,622 | 4/1972 | Farmer | 211/107 |
| 3,734,438 | 5/1973 | Kautz | 211/107 |
| 3,750,992 | 8/1973 | Johnson | 248/219.4 X |
| 3,856,250 | 12/1974 | Farmer | 248/219.4 X |
| 4,103,853 | 8/1978 | Bannan | 211/107 X |
| 4,296,904 | 10/1981 | Farmer | 248/218.4 |
| 4,730,803 | 3/1988 | Hillstrom | 248/219.4 X |
| 4,781,348 | 11/1988 | Cutforth et al. | 248/218.4 |

Primary Examiner—J. Franklin Foss
Attorney, Agent, or Firm—Paul M. Denk

[57] ABSTRACT

An electrical equipment cluster mount for use upon a utility pole or the like is disclosed. The mount includes an elongated bearing plate adapted to be mounted to the utility pole and a hollow polygonal structural member, preferably trapezoidal-shaped, including a plurality of sides, at least one of which is attached to the elongated bearing plate. Individual brackets extend from other sides of the hollow structural member and are interlocked with at least one other adjacent bracket on the hollow structural member. The brackets may be inclined downwardly towards or upwardly away from one another to facilitate mounting of the equipment thereto on different spacings, as well as being positioned at least partially forwardly or rearwardly of the hollow structural member to mount the electrical equipment in a circumferentially disposed array or all on one side of the utility pole.

30 Claims, 11 Drawing Sheets

ELECTRICAL EQUIPMENT CLUSTER MOUNT

BACKGROUND OF THE INVENTION

The present invention relates to electrical equipment cluster mounts, and more particularly, to a wing-type cluster mount that is constructed to provide interlocking and interengaging components that provide enhance strength to weight ratio structural support for heavy electrical equipment devices such as transformers, so as to mount same on a utility pole or the like.

While in the past a single transformer was mounted to a utility pole, the current practice is to mount a series of transformers upon an aluminum electrical cluster mount such as shown in U.S. Pat. Nos. 3,374,978; 3,653,622; 3,856,250 and 4,296,904.

Prior to the development of the aluminum electrical equipment cluster mounts, heavy, press-molded metal plates of the type shown in U.S. Pat. No. 2,879,694, or a pair of channel members braced by elongated angle members shown in U.S. Pat. No. 2,990,151, were used. However, it was discovered that interlocking lightweight aluminum components could be constructed as an electrical equipment cluster mount because, where the lighter weight aluminum sacrificed strength, when assembled in an interlocking structure, they could easily compensate for the lighter weight aluminum and provide added strength to the overall electrical equipment cluster mount construction. As a result, various interlocking aluminum component constructions were developed in several different electrical equipment mounts, as shown by the patents identified in the previous paragraph.

As will be appreciated, where interlocking lightweight aluminum structures have been employed, the flexibility and versatility of such units has sometimes been lacking. For example, it has not always been possible to mount electrical equipment on a different combination of spacings, or to mount such equipment either in a circumferential array around the utility pole or all on one side of the utility pole, as may be required by certain states. Where such flexibility and versatility has been available, the strength of the units have, in some cases, been unnecessarily sacrificed.

SUMMARY OF THE INVENTION

Accordingly, among the several objects and advantages of the present invention may be noted:

the provision of an electrical equipment cluster mount which overcomes the aforementioned deficiencies of the prior art;

the provision of the new and improved electrical equipment cluster mount which provides flexibility and versatility in mounting electrical equipment to a utility pole or the like, without sacrificing strength and durability;

the provision of the aforementioned electrical equipment cluster mount which provides for the mounting of electrical equipment, such as transformers, on different spacings, while also affording mounting of the electrical equipment in a circumferentially disposed array around or all on one side of the utility pole, as may be desired;

the provision of the aforementioned electrical equipment cluster mount which provides optimum environmental endurance in the best strength to weight ratio design developed to date;

the provision of the aforementioned electrical equipment cluster mount which provides new and improved interlocking structure which further adds to the strength, durability and environmental endurance of such units, in order to withstand the forces of nature;

the provision of the aforementioned electrical equipment cluster mount which can be hoisted and mounted on utility poles for quick, safe, and cost-effective installations;

the provision of the aforementioned electrical equipment cluster mount which can be economically and efficiently constructed as extruded aluminum components; pre-assembled as one-piece rigid frame constructions in the factory so as to facilitate field mounting; easily and quickly mounts to the utility pole; when in place, affords exceptional strength per weight ratio in use; provides a long-lasting and durable unit that will not wither or deteriorate under the forces of nature; and is otherwise well adapted for the purposes intended.

Briefly stated, the electrical equipment cluster mount of the present invention is for use on a utility pole or the like. The cluster mount includes an elongated bearing plate adapted to be mounted to the utility pole; a hollow polygonal structural member having a plurality of sides which are attached to the elongated bearing plate along one side thereof; and individual bracket means extending from other sides of the hollow polygonal structural member and interlocked with at least one other adjacent bracket means on the hollow polygonal structural member for mounting electrical equipment in a predetermined clustered array relative to the utility pole.

The hollow structural member is preferably trapezoidal-shaped having generally elongated parallel sides interconnected by top and bottom walls and opposed angularly offset open sides or ends. The hollow structural member is attached to the elongated bearing plate along one of the generally parallel elongated side while the individual bracket means extend from the other generally parallel elongated sides and opposed angularly offset open ends of the hollow structural member.

The individual bracket means that extend from the angularly offset open ends of the hollow structural member includes a pair of bracket arms having inner and outer finger portions interfitting over an associated opposed parallel elongated side with each bracket arm terminating in a free end portion. Fasteners extend through the inner and outer finger portions associated with opposed parallel elongated sides. A U-shaped bracket having free ends, for complementary interfitting engagement with the free ends of the bracket arm, is provided, and fasteners for interconnecting the complementary interfitting free ends of the bracket arms and U-shaped brackets are included. The brackets mounted on the opposed parallel elongated side include space supporting leg bases for overlapping and interlocking engagement relative to the outer finger portions of the bracket arms that extend from the angularly offset open side, for also receiving the fasteners therethrough. The spaced supporting leg bases have free ends which are also in complementary interfitting engagement relative to the free ends of a U-shaped bracket attached thereto by fasteners.

The elongated bearing plate includes spaced distal supporting bases for overlapping and interlocking engagement relative to the outer leg portions of the bracket arms extending from the opposed angularly offset open ends. The fasteners which extend through the inner and outer finger portions of each bracket arm and associated opposed elongated parallel side also extend through the spaced supporting leg bases on one of the opposed elongated parallel sides and also through the spaced distal supporting bases of the elongated bearing plate attached to the other opposed elongated parallel side.

Cooperating and vertically aligned pairs of upper and lower bracket means may be mounted to upper and lower trapezoidal-shaped hollow structural members mounted to the elongated bearing plate. The U-shaped brackets of each cooperating and vertically aligned pair of upper and lower bracket means may be inclined downwardly towards or upwardly away from one another to facilitate mounting of the electrical equipment thereto on different spacings. The opposed angularly offset open sides are angularly directed to cause the electrical equipment to be mounted either in circumferentially disposed array around or all on one side of utility pole. The upper and lower U-shaped brackets, extending from opposed angularly offset open sides of the hollow structural member, have an outer wall on the U-shaped brackets thereof which lie generally in the same plane and is generally parallel to a plane passing through an associated angularly offset open side of the hollow structural member.

Other and further objects and advantages of the present invention will become more apparent from the description that follows.

BRIEF DESCRIPTION OF THE DRAWINGS

In the drawings.

Corresponding reference numerals will be used throughout the various Figures of the drawings.

DESCRIPTION OF THE PREFERRED EMBODIMENT

In the drawings and the description that is to follow it will be understood that there are two basic embodiments of the present invention; FIGS. 1-5 in which the electrical equipment cluster mount is constructed to support a series of transformers in circumferentially disposed array around an associated utility pole; and FIGS. 6-10 in which the electrical equipment cluster mount is constructed such that a series of transformers are supported all on one side of an associated utility pole. However, within the aforementioned basic embodiments disclosed, there are numerous adaptions and variations, providing an exceptionally versatile and environmentally durable electrical equipment cluster mount construction and system, all of which will become more apparent, in the ensuing description.

Figure 11:
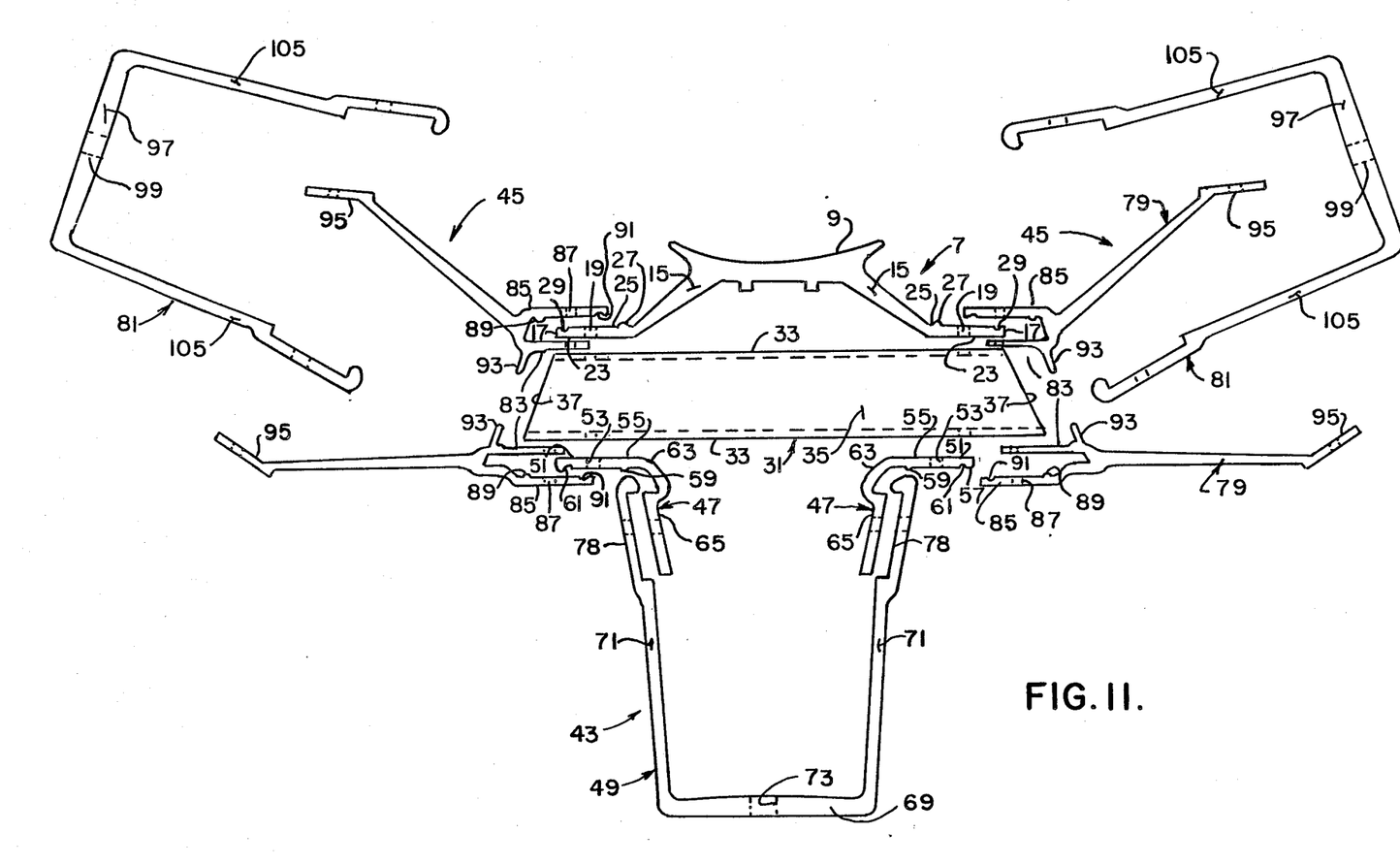
FIG. 11 is an exploded top perspective view of the electrical equipment cluster mount shown in FIGS. 1-5 of the drawings.

Referring first to the embodiment shown in FIGS. 1-5 of the drawings and the companion exploded view of FIG. 11, it will be seen that the electrical equipment cluster mount 1 is constructed to mount a series of electrical equipment transformers 3 or the like in a predetermined clustered array around the utility pole 5. While the transformers 3 and the utility pole 5 may be of any construction and shape, typically they have elongated cylindrical configurations suitably dimensioned on the order of the size relationship illustrated in FIG. 1 of the drawings. It is customary to mount the cylindrical-shaped transformers 3 at the upper end of the elongated utility pole 5, and it is the electrical equipment cluster mount 1 of the present invention that makes this possible.

Reference is now made to the FIGS. 1-5 embodiment and the companion exploded view shown in FIGS. 11 of the drawings. In these figures, it will be shown that the electrical equipment cluster mount 1 comprises a series of interlocking and interengaging extruded aluminum components which are constructed and arranged as shown. One preferred type of aluminum is 6061-T 6 aluminum alloy which, together with the pre-assembled, bolted interlocked and interengaged components, provides a unique or system with optimum environment endurance. In addition, as will become apparent below, the electrical equipment cluster mount 1, including the pre-assembled extruded component thereof, provide the best strength to weight ratio that is available today, for supporting 100 kva through 167 kva transformer units or equipment.

The electrical equipment cluster mount 1 includes an extruded elongated bearing plate 7 adapted to be mounted to the utility pole 5. The elongated bearing plate 7 includes a curved or arcuate base 9 which is complementary configured to the utility pole 5 for complementary mounting thereto. For mounting the elongated bearing plate 7 to the utility pole 5, the arcuate or curved base 9 includes a longitudinal slot 11 which extends through the bottom of the arcuate or curved base 9 and a key hole opening 13 adjacent the upper end of the arcuate or curved base 9, for register with suitably spaced fasteners (not shown) driven or inserted into the utility pole 5. It will be appreciated that the suitably spaced fasteners (not shown) inserted into the utility pole 5 may be extended through the circular portion of the key-hole opening 13 and a correspondingly spaced portion of the longitudinal slot 11, following which the elongated bearing plate 7 can be shifted downward for accommodation of the upper fastener into the longitudinally extending portion of the key hole opening 13, with the lower fastener mounted within the upper portion of the longitudinal slot 11, as is well known.

Extending from an opposite side of the arcuate or curved base 9 are a pair of inclined or angularly outwardly extending walls 15, 15 which are interconnected to a horizontally extending supporting base 17 at the distal or free end of each of the inclined angular offset walls 15, 15. The spaced distal supporting bases 17, 17 of the elongated bearing plate 7 include through openings 19, 19 (see FIG. 11) for receiving the threaded fastener 21, 21 therethrough, as will become apparent. The spaced distal supporting bases 17, 17 have a flat or planar substantially horizontal outer surface 23, 23 for mounting to a hollow structural member, as will become apparent. On the opposite face or surface of the distal supporting bases 17, 17 is an inner wall or surface 25 having a longitudinally extending inner rib 27 and a longitudinally extending outer groove 29, for cooperative engagement with other components of the electrical equipment cluster mount, also which will become apparent.

Figure 2:
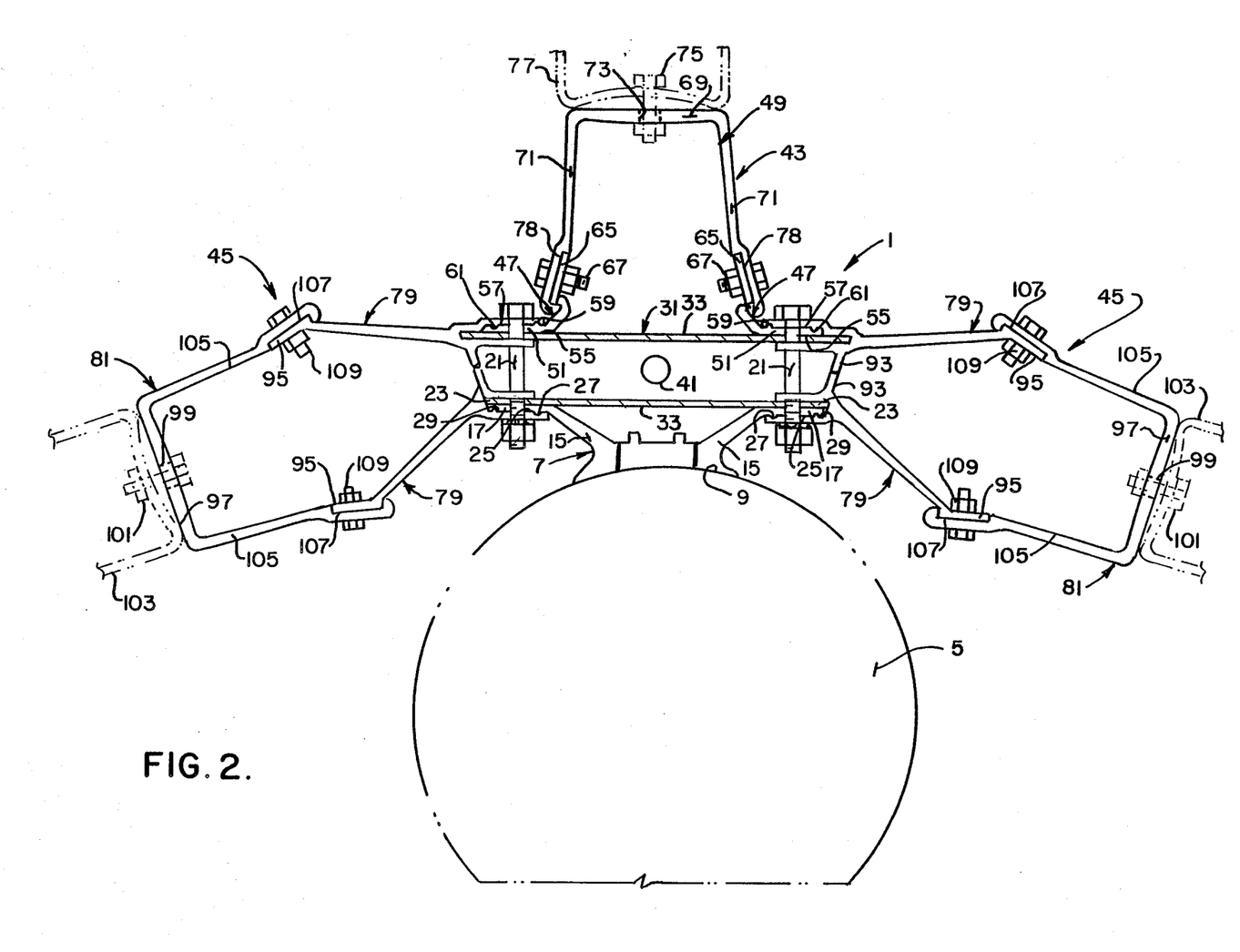
FIG. 2 is an enlarged top plan view, partially in section, of the electrical equipment cluster mount illustrated in FIG. 1.

An elongated bearing plate 7 supports upper and lower hollow polygonal structural members 31, 31 which, together with associated components, are identical in construction, and therefore, it will be understood that a description of either the upper or lower hollow polygonal structural member 31, 31 and related components, applies equally to the other. Each upper and lower hollow polygonal structural member 31 has a generally trapezoidal-shaped cross sectional configuration and includes a pair or spaced and opposed parallel sides 33, 33, for connecting top and bottom wall 35, 35 and angularly offset open sides or ends 37, 37. The spaced and opposed generally parallel elongated sides 33, 33 are also provided with spaced upper and lower aligned openings 39, 39 for receiving the threaded fasteners 21, 21 therethrough, as best seen in FIG. 2 of the drawings. At least the upper hollow structural member 31 has an opening 41 in the bottom wall 35 thereof, to facilitate the insertion of appropriate means, such as a cable hook or the like, for lifting the entire electrical equipment cluster mount 1 into the desired position relative to the utility pole 5 for attachment thereto.

Individual brackets are attached to the hollow structural member 31 to extend from various sides thereof for mounting the transformers 3 in a predetermined circumferential array relative to utility pole 5. Specifically, the bracket assembly 43 is mounted to and extends from the other spaced and generally parallel elongated side 33 of the hollow structural member 31, whereas identical, but oppositely extending bracket assembly 45, 45 are mounted relative to the hollow structural member 31 and extend from the angularly offset open sides or ends 37, 37 thereof.

Referring first to the bracket assembly 43, it will be seen that the bracket assembly 43 includes spaced supporting leg bases 47, 47 and U-shaped bracket 49 mounted to the free ends of the spaced supporting leg bases 47, 47. Each of the supporting leg bases 47 includes a generally horizontally extending base plate 51 having an opening 53 (see FIG. 11) therethrough so for receiving the threaded fastener 21. The outer face or surface 55 of the base plate 51 is generally flat or planar for face-to-face mounting relative to the hollow structural member 31, whereas the opposite or inner face 57 of the base plate 51 includes an inner upstanding rib 59 and an outer groove or recess 61, for interlocking engagement relative to bracket arms of the other bracket assemblies 45, 45, as will become apparent. Extending upwardly and inwardly relative to the base plate 51, 51 are intermediate inclined walls 63, 63 which are interconnected to inclined or angularly offset walls 65, 65 forming a complementary boss portion area. Each of the inclined walls or boss portions 65 of the supporting leg bases 47 have openings therethrough for receiving the threaded fastener 67 to attach the U-shaped bracket 49 relative to the spaced supporting leg bases 47.

The U-shaped bracket 49 includes a bight or end wall portion 69 and generally opposed depending legs 71, 71. The bight or end wall 69 of the U-shaped bracket 49 has an opening 73 therethrough for receiving fastener 75 (see FIG. 1) facilitating mounting a transformer bracket 77 to the U-shaped racket 49, as is shown. Outer or free ends of the depending legs 71, 71 of the U-shaped bracket 49 include a complementary C-shaped recess 78 for complementary reception of the inclined walls or boss portions 65 of the spaced supporting leg bases 47. It will thus be appreciated that the bracket assembly 43 including the leg spaced leg supporting bases 47, 47, is mounted to the hollow polygonal structure 31 via the threaded fasteners 21, 21 while the U-shaped bracket 49 has the C-shaped recesses 78 at the free ends of the legs 71, 71 for reception of the complementary shaped boss portion 65, 65 of the supporting leg bases 47, 47, and interconnected by the threaded fasteners 67.

Each of the bracket assemblies 45, 45 are identical, but oppositely directed relative to the hollow structural member 31. Each of the bracket assemblies 45 include a pair bracket arms 79, 79 which are identically constructed and a U-shaped bracket 81. As best seen in FIG. 11 of the drawings, each of the bracket arms 79 are generally elongated elements having spaced inner and outer finger portions 83, 85 at one end thereof. Each of the inner and outer fingers 83, 85 have aligned openings 87 therethrough for receiving the threaded fastener 21, when the bracket arm 79 is assembled relative to hollow structural member 31. In order to enhance the interlocking engagement between the bracket arms 79 and the spaced supporting leg bases 47 on one of the elongated sides 33 of the hollow structural member, as well as the elongated bearing plate 7 and the other elongated side 33 of the hollow structural member 31, each of the outer fingers 85 of each bracket arm 79 are provided with an inner rib 89 and an outer groove 91. With respect to the elongated bearing plate 7, the distal supporting bases 17, 17 thereof include the inner rib 27 which is adapted to be received in outer finger groove 91 while the outer finger groove 29 receives the inner rib 89 of the outer finger 85. This occurs when the inner and outer fingers 83, 85 are inserted into the open side or end 37 of the hollow structural member 31 for interfitting engagement over an associated opposed parallel elongated side 33, while the distal supporting bases 17, 17 of the elongated bearing plate 7 are interfitted and interlocked relative thereto in the corresponding and complementary shaped longitudinal ribs and grooves thereof, as explained above.

With respect to the spaced supporting leg bases 47, 47, it will be noted that the inner and outer rib and groove 59, 61, thereof mate with the corresponding longitudinally extending rib and groove 89, 91 of the outer finger 85, when associated bracket arms 79 are assembled relative to the hollow structural member 31 and spaced supporting leg bases 47.

When the spaced bracket arms 79, 79 of each bracket assembly 45 are assembled relative to the hollow structural member 31, while also being matingly assembled relative to the elongated bearing plate 7 and the spaced supporting leg bases 47, 47, all of the aforementioned parts can be interlocked and interconnected relative to one another through the threaded fasteners 21, which assemble and hold the aforementioned components in a stable and rigid pre-assembled relationship to one another. It will be noted that the bracket arms 79, 79 each have an angularly offset or inclined wall 93 interconnected adjacent the innermost area of the inner finger 83 for closing off the angularly offset open side or end 37 of the hollow structural member 31, which may also be used to provide abutting relationship to one another, in order to provide increased strength and rigidity.

Each of the bracket arms 79 at the outer end thereof includes an inclined wall or boss portion 95, for purposes of which will presently appear. The U-shaped bracket 81 of each bracket assembly 45 has an intermediate or end wall 97 with a through opening 99 therethrough for receiving the threaded fastener 101 to mount a transformer bracket 103 thereto. Each U-shaped bracket 81 also has a pair of spaced depending legs 105, 105 extending from the end wall 97 thereof, the outer or terminal portion of which has a C-shaped recess 107 for complementary mating engagement relative to the inclined wall or boss portions 95 of each bracket arm 79. Suitable fasteners 109 extend through free ends of the U-shaped bracket 81 and bracket arms 79 in the vicinity of the complementary C-shaped recess 107 and boss portion 95.

Figure 3:
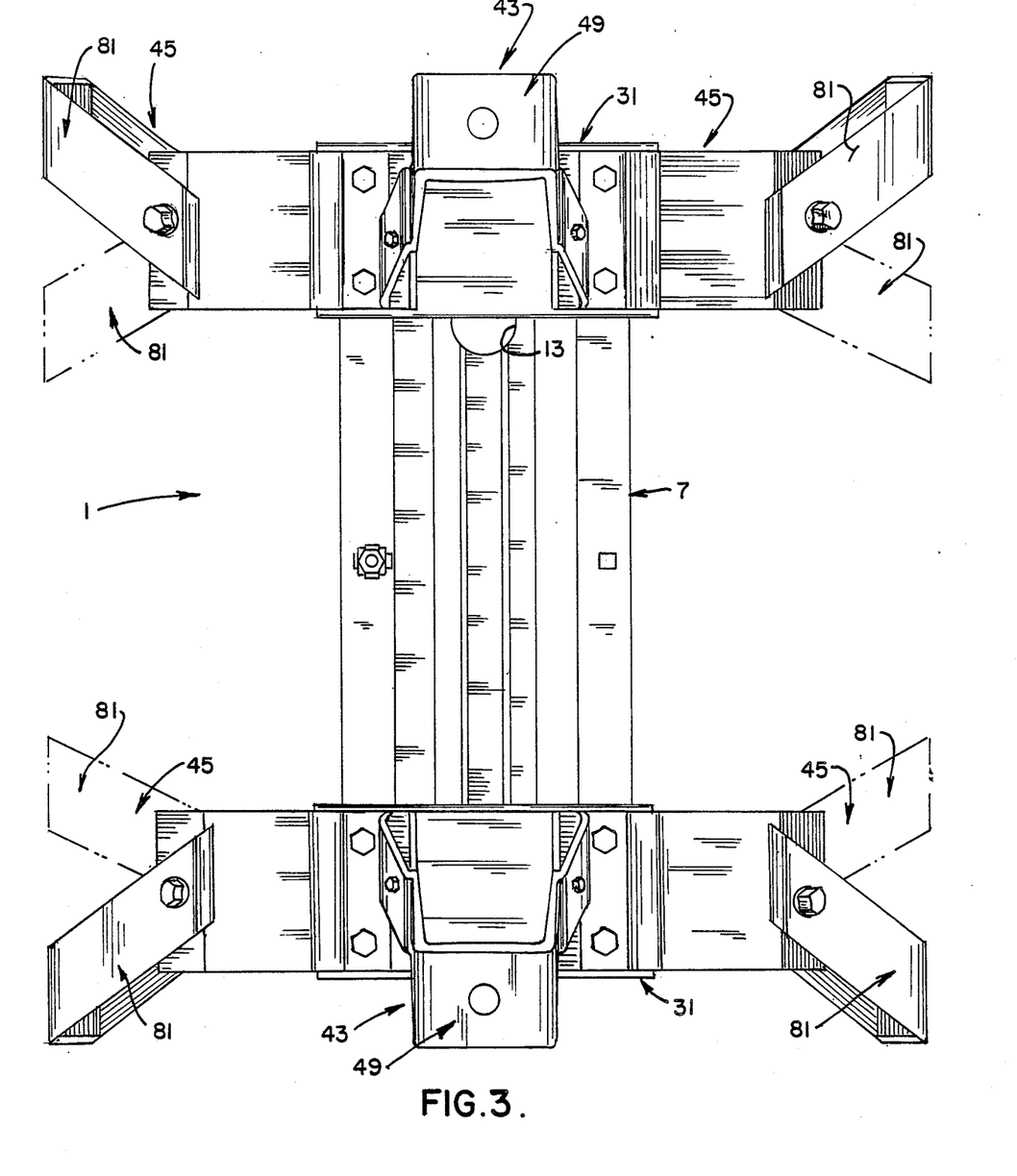
FIG. 3 is a front elevational view of the electrical equipment cluster mount shown in FIGS. 1-2 of the drawings.
Figure 4:
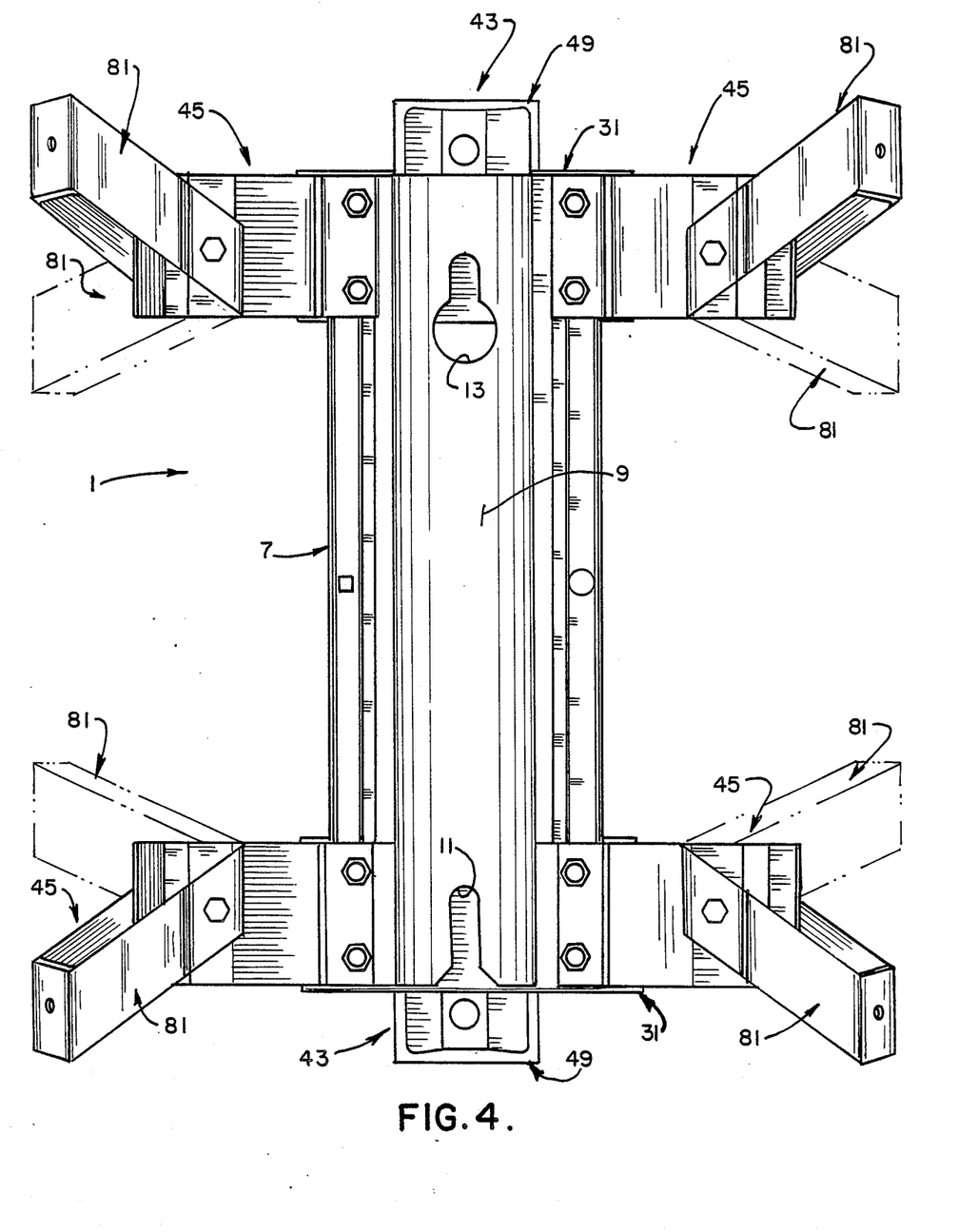
FIG. 4 is a rear elevational view of the electrical equipment cluster mount shown in FIGS. 1-3.
Figure 5:
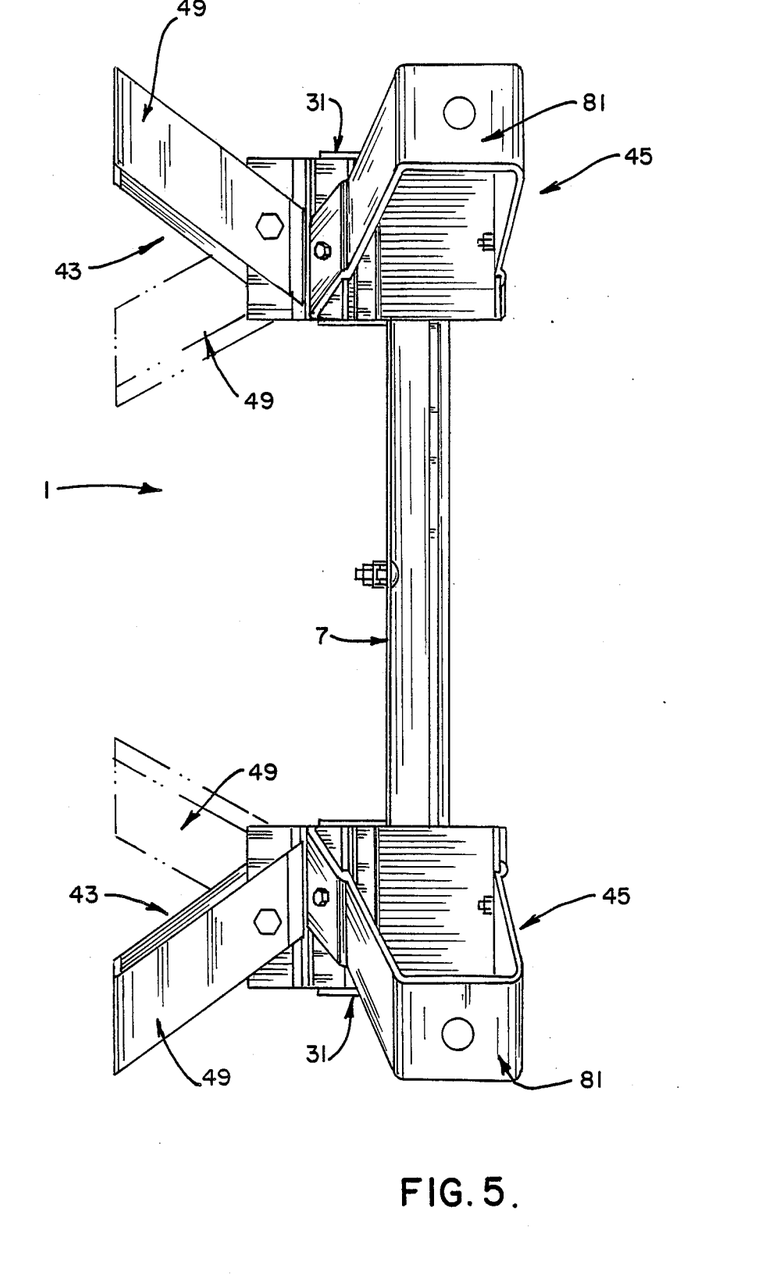
FIG. 5 is an end elevational view of the electrical equipment cluster mount shown in FIGS. 1-4 of the drawings.

From the foregoing explanation, it will be appreciated that the interlocked and interengaged pre-assembled bolted components of the electrical equipment cluster mount 1 will provide a strong and durable construction in a high strength to weight ratio design. In addition, and with specific reference to FIGS. 3-5 of the drawings, it will be noted that cooperating and vertically aligned pairs of upper and lower bracket assemblies 43, 45, 45, each mounted to upper and lower trapezoidal-shaped hollow structural members 31, 31, provide versatility for mounting transformers 3 on different spacings. As shown in the full line illustrations in FIGS. 3-5 of the drawings, the U-shaped brackets 49, 49 of the bracket assemblies 43, 43 and the U-shaped brackets 81, 81 of the bracket assemblies 45, 45, in the upper and lower cooperating and vertically aligned pairs thereof, are shown as being upwardly or downwardly inclined as the case may be, but in any event, away from one another. Specifically, the upper U-shaped brackets 49 bracket assembly 43 and the U-shaped brackets 81, 81 of the bracket assemblies 45, 45 are upwardly inclined away from the lower cooperating and vertically aligned pairs of bracket assemblies 43, 45, 45, while the U-shaped brackets 49 and 81, 81 thereof are downwardly inclined away from the upper U-shaped brackets. In the typical construction, with the U-shaped brackets extending upwardly and downwardly away from one another in the upper and lower cooperating and vertically aligned pairs thereof, the cluster mount 1 will support the transformers 3 on 24 inch spacing. In order to mount the transformers 3 on 12 inch spacing, the U-shaped brackets are inclined upwardly towards one another. Specifically, as shown in FIGS. 3-4 of the drawings, the cooperating and vertically aligned pairs of U-shaped brackets 81, 81 are inclined towards one another, while FIG. 5 of the drawings shows the U-shaped bracket 49, 49 as being inclined towards one another. This is made possible by simply reversing the mounting arrangement of the U-shaped brackets, including cooperating C-shaped recess relative to the mating boss portions the various bracket assemblies 43, 45 and 45 as discussed above. In addition, it will be apparent that various other alternative spacing arrangements are possible. For example, one or both of the upper and lower hollow structural members 31, 31 may be shifted towards one another, with U-shaped brackets of the bracket assembly 43, 45 and 45 being inclined towards and or away from one another, for the suitable spacing desired in mounting transformers 3 thereto.

Figure 6:
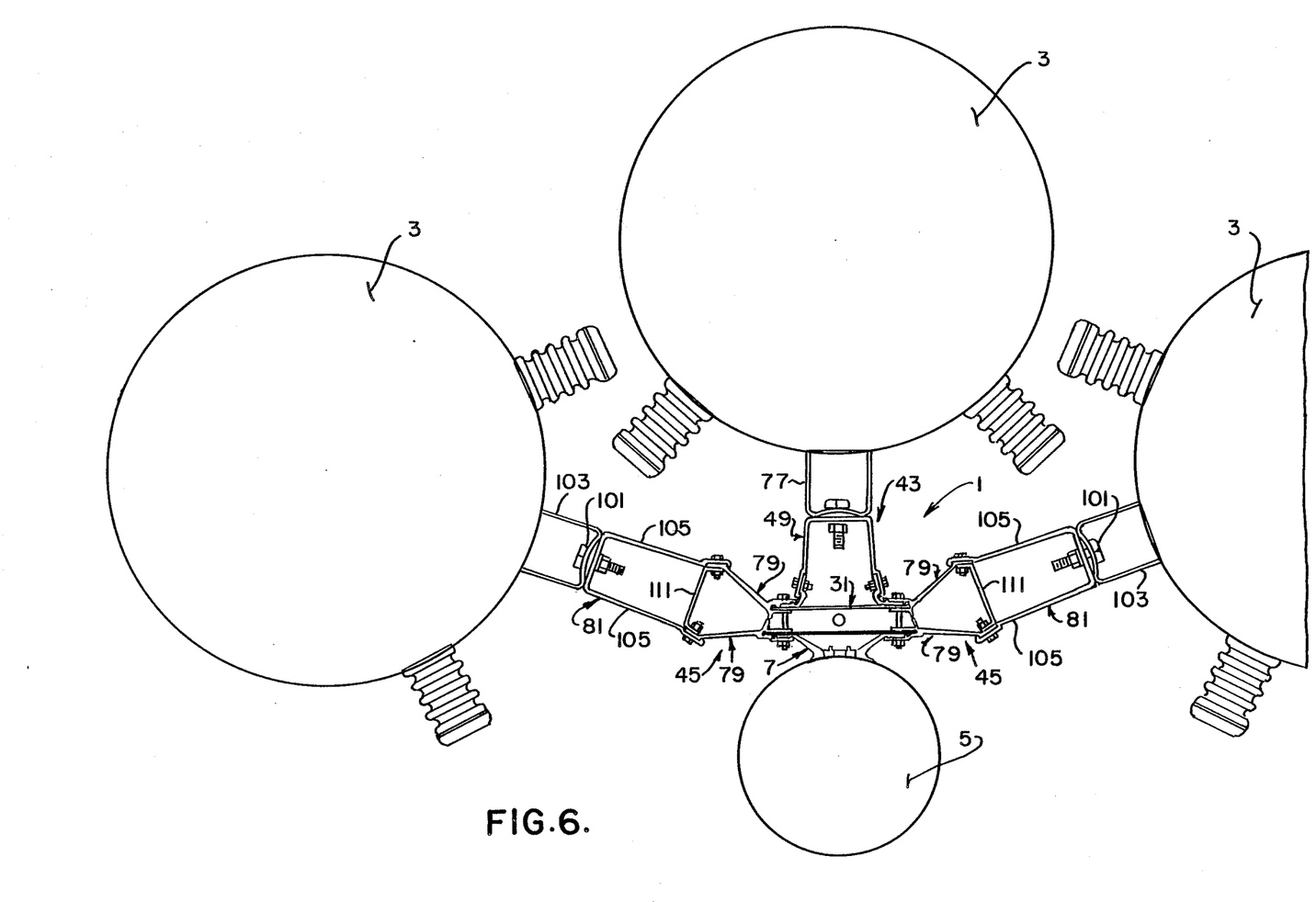
FIG. 6 is a top plan view, partially in section, of a modified form of electrical equipment cluster mount which transformers are mounted all on one side of a utility pole.
Figure 7:
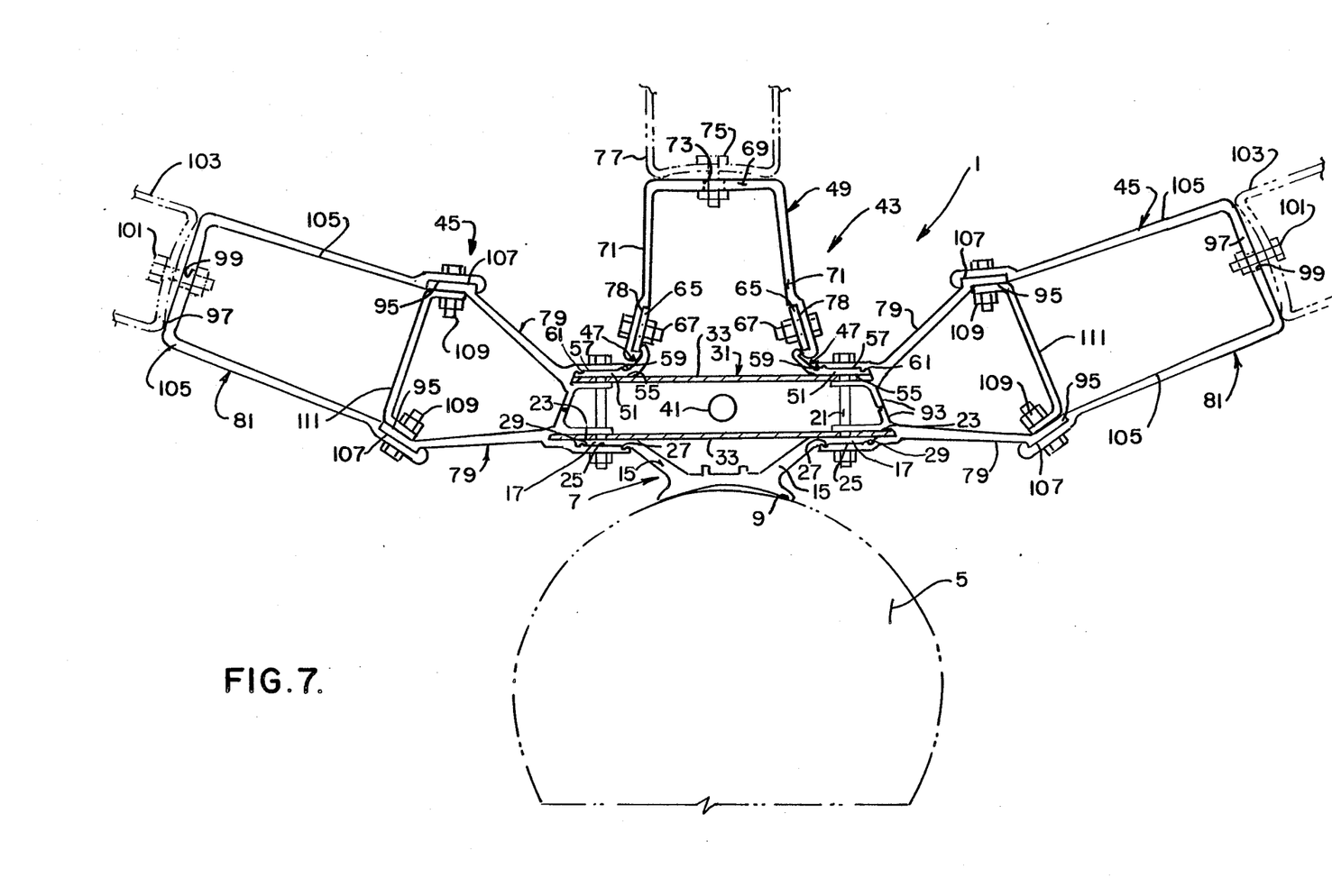
FIG. 7 is an enlarged top plan view, partially in section, of the electrical equipment cluster mount illustrated in FIG. 6 of the drawings.

Reference is now made to FIGS. 7-10 of the drawings for the second illustrated embodiment of the present invention in which the electrical equipment cluster mount 1 uses essentially the same components as the FIGS. 1-5 embodiments, but enables the transformers 3 to be mounted all on one side of the utility pole 5, as best seen in FIG. 6 of the drawings. The component parts of the electrical equipment cluster mount 1 embodiment illustrated in FIGS. 7-10 are correspondingly identical with the component constructions of FIGS. 1-5, with the exception of the U-shaped brackets 81 in the generally opposed bracket assemblies 45, 45. It will be noted that the legs 105, 105 of each U-shaped bracket 81 are substantially longer than the corresponding legs 105, 105 of the FIGS. 1-5 bracket 81 construction. As a result, brace elements 111 extend across and cooperate with the C-shaped recess 107 and complementary boss 95, enabling the threaded fasteners 109 to interconnect the brace elements 111 between the outer ends of bracket arm 79, 79 and the depending legs 105, 105 of the U-shaped bracket 81. Other than this structural modification, the instruction of the component parts of the electrical equipment cluster mount in FIGS. 1-5 and FIGS. 6-10 are substantially identical.

Figure 1:
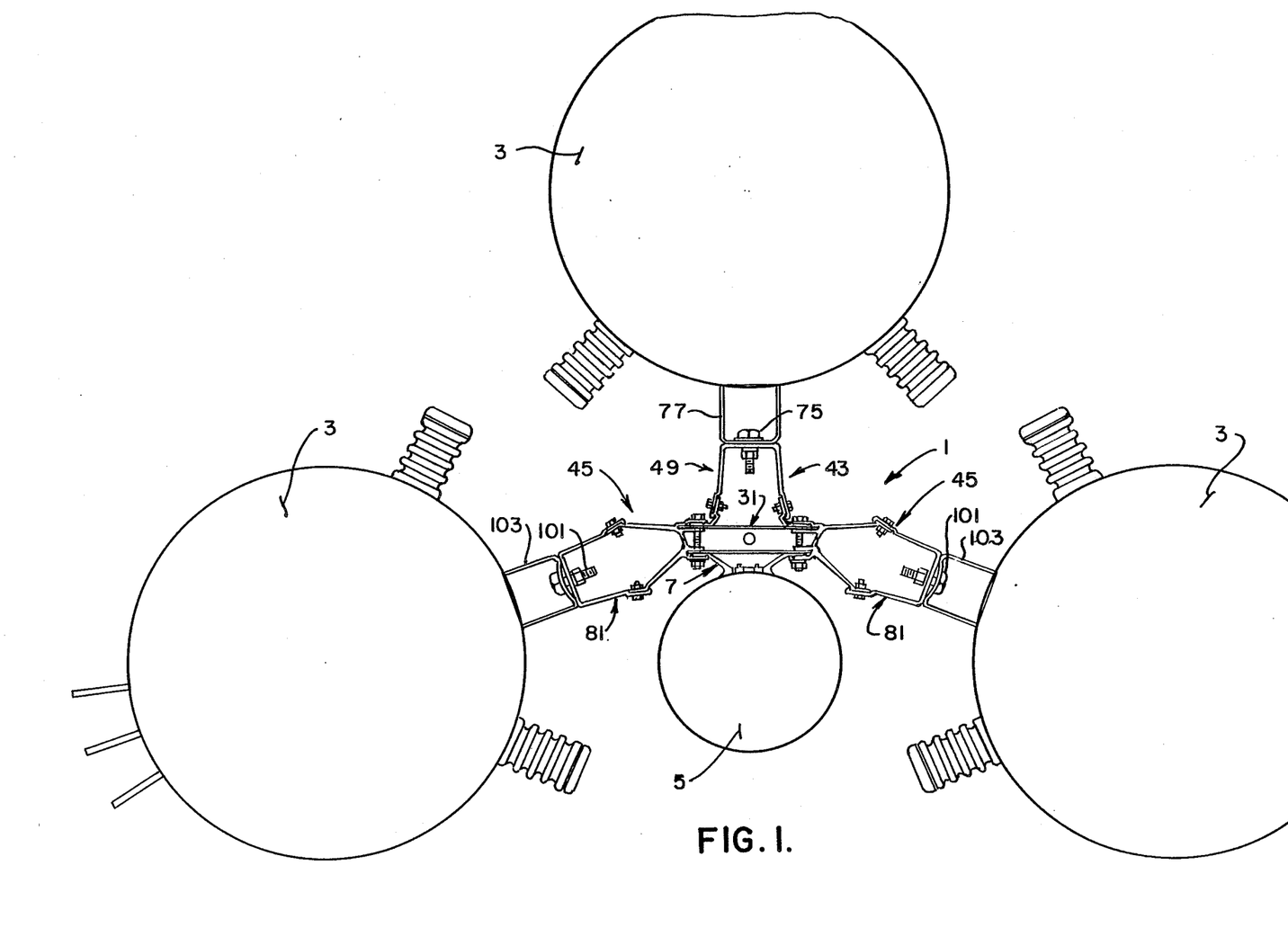
FIG. 1 is a top plan view partially in section, of the electrical equipment cluster mount of the present invention shown as being mounted to a utility pole for supporting a series of transformers, in a circumferentially disposed array around the utility pole.

However, it will be noted that the arrangement and position of the component parts in FIGS. 1-5 and 6-10 are substantially different, enabling the FIGS. 1-5 construction to position the transformers 3 in a circumferentially disposed array around the utility pole 5, while the component arrangement and position in FIGS. 6-10 of the drawings causes the transformers 3 all on one side of the utility pole 5. In this regard, it will be noted that the trapezoidal-shaped hollow structural members 31, 31 are reversed. More specifically, whereas the elongated bearing plate 7 is mounted to the shorter of the two spaced and opposed elongated sides 33, 33 in the FIG. 2 embodiment, the elongated bearing plate 7 is mounted to the longer of the two spaced and opposed elongated sides 33, 33 in the FIGS. 6-10 embodiment. As a result, the bracket assembly 43 the FIGS. 1-5 embodiment is mounted to the longer of the two spaced and opposed elongated sides 33, whereas in the FIGS. 6-10 embodiment, the bracket assembly 43 is mounted to the shorter of the two spaced and opposed parallel elongated sides 33, 33. In addition, the angularly offset open sides or ends 37, 37 of the hollow structural member 31, as a result of the mounting construction described above, extend at a different angle. Thus, when the spaced pair of cooperating bracket arms 79, 79 are mounted to the hollow structural member 31 in FIGS. 1-5, the cooperating bracket arm 79, will extend partially around the utility pole 5 such that when the U- shaped brackets 81 are mounted thereto, the spaced and opposed bracket assemblies 45, 45 will permit mounting of the transformers 3 as shown in FIG. 1 of the drawings. FIGS. 6–10, on the other hand, with the different angularly offset open sides or ends 37, 37 cause the associated bracket arms 79, 79 and the U-shaped brackets 81 associated therewith to extend away from the utility pole 5, enabling transformer mounting thereto as illustrated in FIG. 6 of the drawings. Different mounting for the transformers 3 provides versatility in the overall cluster mount 1 construction so as to meet different state requirements, as may be necessary.

Figure 8:
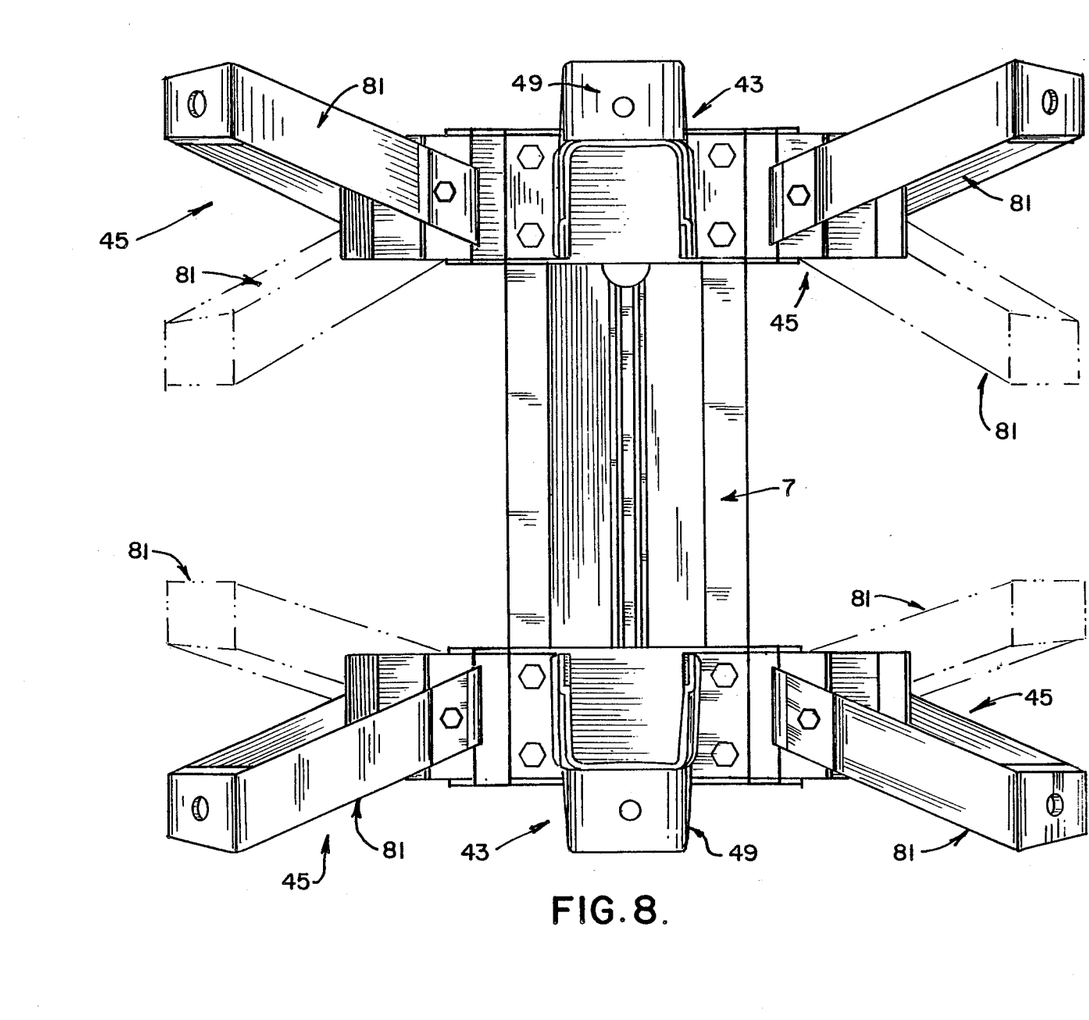
FIG. 8 is a front elevational view of the electrical equipment cluster mount illustrated in FIGS. 6-7 of the drawings.
Figure 9:
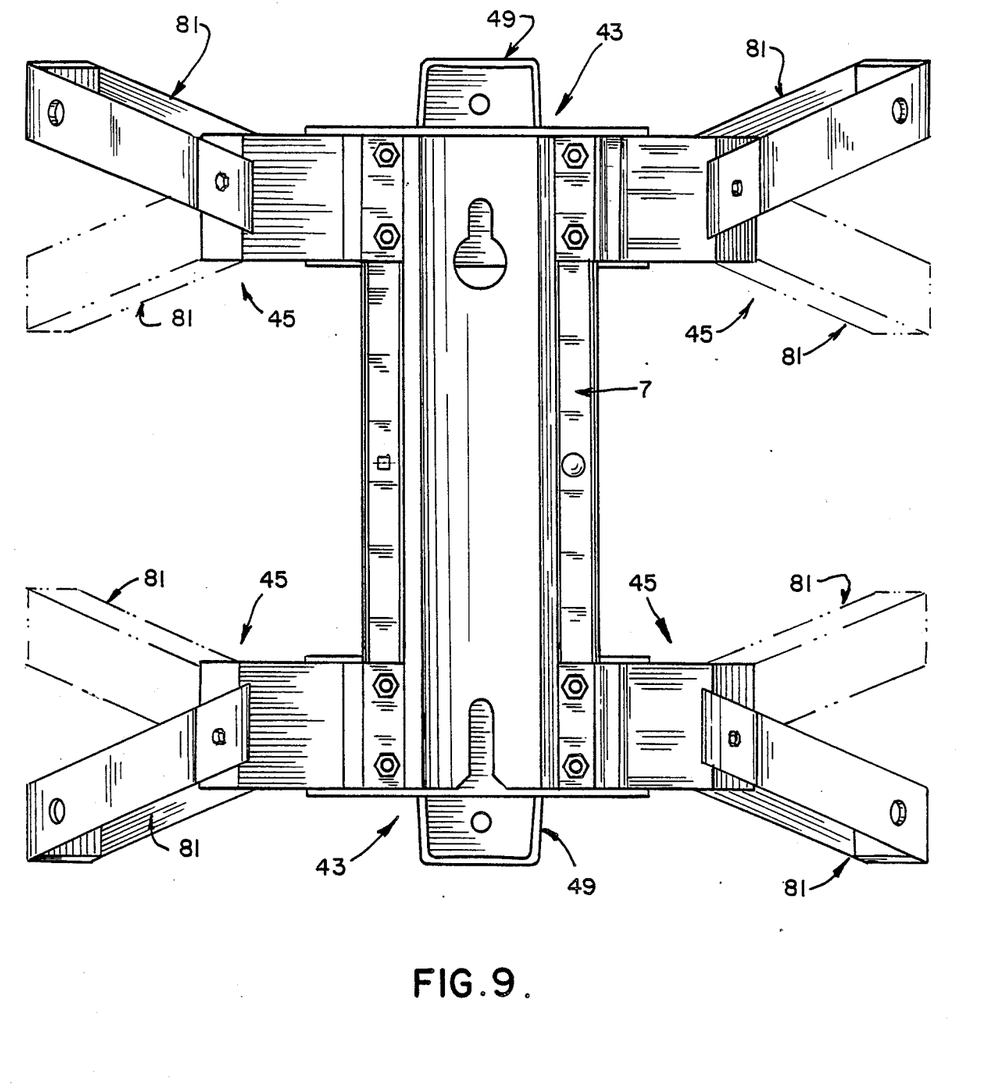
FIG. 9 is a rear elevational view of the electrical equipment cluster mount shown in FIGS. 6-8 of the drawings.
Figure 10:
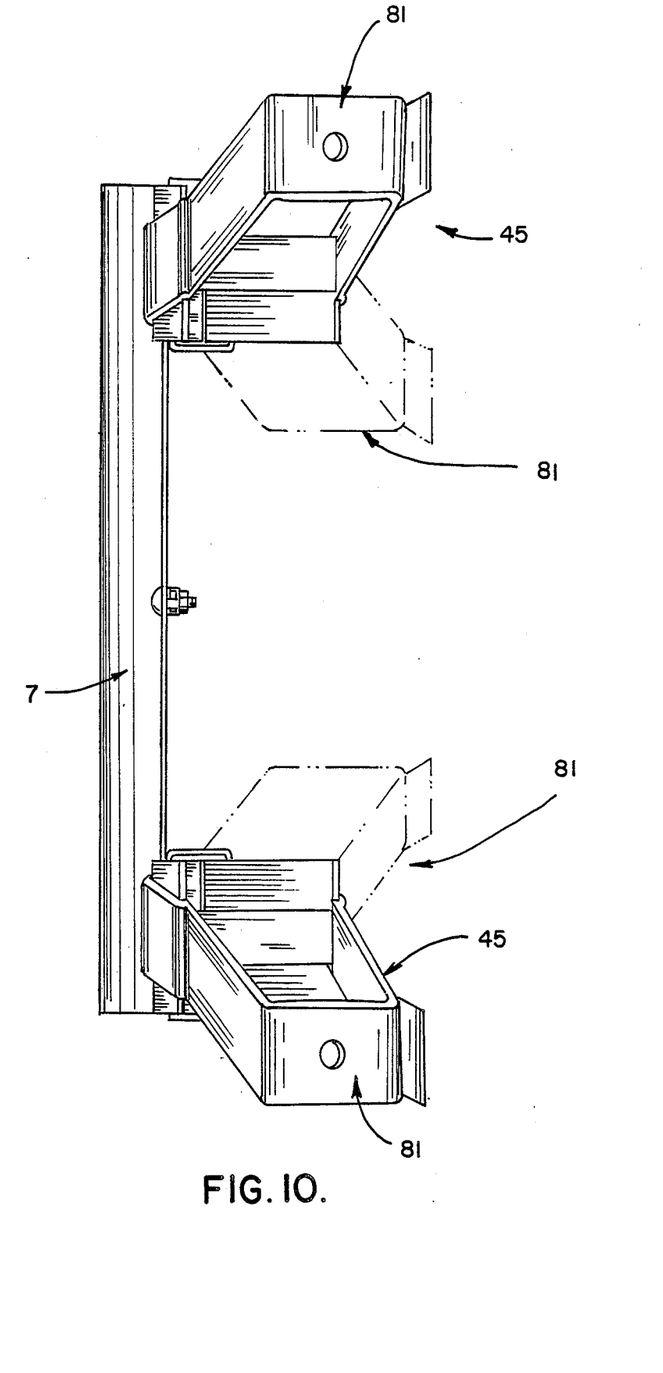
FIG. 10 is an end elevational view of the electrical equipment cluster mount shown in FIGS. 6-9 of the drawings.

Although the FIGS. 6–10 embodiment show the transformers 3 to be mounted all on one side of the utility pole 5, they still enable transformers 3 to be mounted on different spacings similar to the FIGS. 1–5 embodiment. Thus, as illustrated in FIGS. 8–10 of the drawings, the upper and lower cooperating vertically aligned pairs of U-shaped brackets 49, 49 of the bracket assemblies 43, 43 and the U-shaped brackets 81, 81 of the bracket assemblies 45, 45 may be inclined downwardly away from or upwardly towards one another as illustrated in the full and dotted line representation in these Figures, for different mounting spacing of the transformers 3 relative thereto. Also as explained above, the hollow polygonal members 31, 31 may be shifted towards one another with the various U-shaped brackets in the cluster mount 1 positioned upwardly or downwardly to provide various spacing, as may be desired.

From the foregoing, it will now be appreciated that the electrical equipment cluster mount 1 shown in the embodiments, including various modifications and variations thereof, provides an extremely strong and durable construction, with exceptional versatility for mounting electrical equipment, such as transformers, at various circumferentially disposed positions around or all on one side of a utility pole, while also enabling the transformers to be mounted on different spacings, all of the foregoing being accomplished by simply interchanging or inverting the various components parts relative to one another, as will now be appreciated.

In view of the above, it will be seen that the several objects and features of this invention are achieved and other advantageous results attained.

As various changes could be made in the above constructions without departing from the scope of the invention, it is intended that all matter contained in the above description or shown in the accompanied drawings shall be interpreted as illustrative and not in a limiting sense.

We claim:

1. An electrical equipment cluster mount for use upon a utility pole or the like comprising:
    an elongated bearing plate adapted to be mounted to the utility pole;
    a hollow polygonal structural member having a plurality of sides and being attached to said elongated bearing plate along one side thereof; and
    individual electrical equipment holding bracket means mounted to said hollow structural member and extending from other sides of said hollow polygonal structural member and contiguously interlocked with at least one other adjacent electrical equipment holding bracket means on said hollow polygonal structural member for mounting electrical equipment in a predetermined clustered array relative to said utility pole.

2. The electrical equipment cluster mount as defined in claim 1 wherein at least one of said bracket means is also interlocked relative to said elongated bearing plate.

3. The electrical equipment cluster mount as defined in claim 1 including fasteners extending through said interlocked bracket means and said hollow polygonal structural member.

4. Electrical equipment cluster as defined in claim 2 including fasteners also extending through said interlocked bracket means and the elongated bearing plate, and said hollow polygonal structural member.

5. The electrical equipment cluster mount as defined in claim 4 wherein the said interlocked and adjacent bracket means includes complementary interfitting and overlapping portions.

6. The electrical equipment cluster mount as defined in claim 5 wherein said hollow polygonal structural member includes opposed sides which are angularly offset relative to one another, each of said opposed angularly offset sides having connected thereto one of said other adjacent bracket means, which bracket means also being angularly offset relative to one another.

7. The electrical equipment cluster mount as defined in claim 6 wherein said opposed angularly offset sides are angularly directed to cause said electrical equipment to be mounted in circumferential disposed array on said bracket means about said utility pole.

8. The electrical equipment cluster mount as defined in claim 6 wherein said opposed angularly offset sides are angularly directed to cause said electrical equipment to be mounted on said bracket means all on one side of said utility pole.

9. The electrical equipment cluster mount as defined in claim 6 wherein said hollow polygonal structural member has a trapezoidal cross-sectional shape including opposed parallel elongated sides, one of which is attached to said elongated bearing plate and the other opposed parallel elongated side having one of said bracket means attached thereto, said trapezoidal-shaped hollow structural member having top and bottom walls connecting said opposed parallel elongated sides and also having opposed angularly offset open sides with individual bracket means extending therefrom.

10. The electrical equipment cluster mount as defined in claim 9 wherein each bracket means extending from one of said opposed angularly offset open sides includes a pair of bracket arms which extend angularly outwardly from an associated angularly offset open side, each of said bracket arms terminating at a free end thereof, a U-shaped bracket having free ends for complementary interfitting engagement with the free ends of said bracket arms, and fasteners for interconnecting the complementary interfitting free ends of said bracket arms and said U-shaped bracket.

11. The electrical equipment cluster mount as defined in claim 10 wherein the complementary interfitting free ends of each said bracket arm and said U-shaped bracket include a complementary C-shaped recess and boss portion.

12. The electrical equipment cluster mount as defined in claim 10 including a brace extending between the free ends of said bracket arms and U-shaped bracket when interconnected together.

13. The electrical equipment cluster mount as defined in claim 10 wherein each bracket arm adjacent its associated angularly offset open side includes an interfitting inner finger portion received with said open side and hollow structural member engaging an inner surface of an associated opposed parallel elongated side while a cooperating parallel outer finger portion of each bracket arm is in complementary and interfitting engagement with an adjacent bracket means or elongated bearing plate for operative engagement with an outer surface of said associated opposed parallel elongated side.

14. The electrical equipment cluster mount as defined in claim 13 wherein a threaded fastener extends through said opposed parallel elongated sides including the inner and outer finger portions of a bracket arm extending from one of said angularly offset open sides and an adjacent bracket means or elongated bearing plate.

15. The electrical equipment cluster mount as defined in claim 14 wherein said elongated bearing plate includes spaced distal supporting bases for overlapping and interlocking engagement relative to the outer leg portions of bracket arms extending from said opposed angularly offset open side.

16. The electrical equipment cluster mount as defined in claim 15 including said individual bracket means also mounted on one of said opposed parallel elongated sides opposite from said elongated bearing plate.

17. The electrical equipment cluster mount as defined in claim 16 wherein said bracket means mounted on said one opposed parallel elongated side includes spaced supporting leg bases for overlapping and interlocking engagement relative to the outer finger portions of said bracket arms extending from said angularly offset open sides.

18. The electrical equipment cluster mount as defined in claim 17 wherein the spaced supporting leg bases have free ends which are in complementary interfitting engagement relative to free ends of said shaped U-shaped bracket and being attached thereto by fasteners.

19. The electrical equipment cluster mount as defined in claim 18 wherein the complementary interfitting free ends of said supporting leg bases and U-shaped bracket include a complementary C-shaped recess and boss portion.

20. The electrical equipment mount as defined in claim 10 wherein the U-shaped bracket attached to said bracket arms as extending from each of said opposed angular offset open sides includes an integral outer wall for mounting electrical equipment thereto, the outer wall of each said U-shaped bracket being generally parallel to a plane that is parallel to a plane that is aligned with the angularly offset open side of said trapezoidal-shaped hollow structural member.

21. The electrical equipment cluster mount as defined in claim 20 wherein said cooperating and vertically aligned pairs of upper and lower bracket means are also shiftable vertically toward and away from one another to provide additional different mounting spacings of said electrical equipment thereto.

22. The electrical equipment cluster mount as defined in claim 21 wherein the upper and lower U-shaped brackets extending from opposed angularly offset open sides have an outer wall for mounting electrical equipment, the outer wall of said upper and lower U-shaped brackets lying generally in the same plane and being generally parallel to a plane passing through an associated angular offset open side of said trapezoidal-shaped hollow structural member.

23. An electrical equipment cluster mount for use upon a utility pole or the like comprising:
an elongated bearing plate adapted to be mounted to the utility pole;

a trapezoidal-shaped hollow structural member having generally elongated parallel sides, opposed angularly offset interconnected top and bottom walls and open ends, said hollow structural member being attached to said elongated bearing plate along one of said generally parallel elongated sides; and individual electrical equipment holding bracket means mounted to said hollow structural member and extending from said other generally parallel elongated side and opposed angularly offset open ends of said hollow structural member and for mounting of electrical equipment in a predetermined clustered array relative to said utility pole, adjacent electrical equipment holding bracket means on said hollow structural member being contiguously interlocked relative to one another and also to said hollow structural member.

24. The electrical equipment cluster mount as defined in claim 23 wherein the individual bracket means extending from said angularly offset open ends includes a pair of bracket arms having inner and outer finger portions interfitting over an associated opposed parallel elongated side and each bracket arm terminating in a free end portion, fasteners extending through the inner and outer finger portions and associated opposed parallel elongated side, a U-shaped bracket having free ends for complementary interfitting engagement with the free ends of said bracket arms, and fasteners for interconnecting the complementary interfitting free ends of said bracket arms and U-shaped bracket.

25. The electrical equipment cluster mount as defined in claim 24 wherein the bracket means mounted on said opposed parallel elongated side includes spaced supporting leg bases for overlapping and interlocking engagement relative to the outer finger portions of said bracket arms extending from said angularly offset open sides and also receiving said fasteners therethrough, said spaced supporting leg bases having free ends which are in complementary interfitting engagement relative to free ends of a U-shaped bracket attacked thereto by fasteners.

26. The electrical equipment cluster mount as defined in claim 25 wherein said elongated bearing plate includes spaced distal supporting bases for overlapping an interlocking engagement relative to the outer leg portions of bracket arms extending from said opposed angularly offset open sides, and said fasteners which extend through inner and outer finger portions of each bracket arm and associated opposed elongated parallel side also extend through the spaced supporting leg bases on one of said opposed elongated parallel side.

27. The electrical equipment cluster mount as defined in claim 26 including cooperating and vertically aligned pairs of upper and lower bracket means each mounted to upper and lower trapezoidal-shaped hollow structural members attached to said elongated bearing plate, the U-shaped brackets of each cooperating and vertically aligned pair of upper and lower bracket means being inclined downwardly towards or upwardly away from one another to facilitate mounting of said electrical equipment thereto on different spacings.

28. The electrical equipment cluster mount as defined in claim 27 wherein the opposed angularly offset open sides are angularly directed to cause said electrical equipment to be mounted in circumferential disposed array around or all on one side of said utility pole.

29. The electrical equipment cluster mount as defined in claim 27 wherein the upper and lower U-shaped brackets extending from opposed angularly offset open sides have an outer wall on said U-shaped brackets lying generally in the same plane and being generally parallel to a plane passing through an associated angularly offset open side of said trapezoidal-shaped hollow structural member.

30. The electrical equipment cluster mount as defined in claim 10 and including a pair of trapezoidial shaped hollow structural members mounted to said elongated bearing plate, said pair of hollow structural members aligned vertically to comprise upper and lower disposed hollow structural members, there being bracket means extending from each of said angularly offset open sides and from the other side of said hollow structural members, the bracket means connecting with each of the hollow structural members being vertically aligned as pairs of upper and lower bracket means, and each bracket means incorporating its respective U-shaped bracket of each cooperating and vertically aligned pair of upper and lower bracket means and being arranged inclined downwardly towards or upwardly away from one another to facilitate mounting of said electrical equipment thereto at differing spacings.

* * * * *

UNITED STATES PATENT AND TRADEMARK OFFICE
CERTIFICATE OF CORRECTION

PATENT NO. : 4,896,856

DATED : January 30, 1990

INVENTOR(S) : Marion R. Farmer and Randall L. Hook

It is certified that error appears in the above—identified patent and that said Letters Patent is hereby corrected as shown below:

Claim 21, column 11, line 51, change "20" to ---30---.

Signed and Sealed this

Eleventh Day of December, 1990

Attest:

HARRY F. MANBECK, JR.

Attesting Officer     Commissioner of Patents and Trademarks